No. 620,916. Patented Mar. 14, 1899.
J. A. HAFNER.
MOTOR MECHANISM.
(Application filed July 29, 1897.)

(No Model.) 4 Sheets—Sheet 1.

WITNESSES
C. Byrnes.
INVENTOR
Jno. A. Hafner

THE NORRIS PETERS CO., PHOTO-LITHO., WASHINGTON, D. C.

No. 620,916. Patented Mar. 14, 1899.
J. A. HAFNER.
MOTOR MECHANISM.
(Application filed July 29, 1897.)

(No Model.) 4 Sheets—Sheet 2.

WITNESSES
C. Byrnes.
L. A. Connor.

INVENTOR
Jno. A. Hafner

No. 620,916. Patented Mar. 14, 1899.
J. A. HAFNER.
MOTOR MECHANISM.
(Application filed July 29, 1897.)
(No Model.) 4 Sheets—Sheet 3.

WITNESSES
C. Byrnes.

INVENTOR
Jno. A. Hafner

No. 620,916. Patented Mar. 14, 1899.
J. A. HAFNER.
MOTOR MECHANISM.
(Application filed July 29, 1897.)

(No Model.) 4 Sheets—Sheet 4.

WITNESSES
Chas. P. Swett
John N. ...

INVENTOR
John A. Hafner
by Bakewell & Bakewell
his attys.

THE NORRIS PETERS CO., PHOTO-LITHO., WASHINGTON, D. C.

UNITED STATES PATENT OFFICE.

JOHN A. HAFNER, OF PITTSBURG, PENNSYLVANIA.

MOTOR MECHANISM.

SPECIFICATION forming part of Letters Patent No. 620,916, dated March 14, 1899.

Application filed July 29, 1897. Serial No. 646,303. (No model.)

*To all whom it may concern:*

Be it known that I, JOHN A. HAFNER, of Pittsburg, in the county of Allegheny and State of Pennsylvania, have invented a new and useful Improvement in Motor Mechanism, of which the following is a full, clear, and exact description, reference being had to the accompanying drawings, forming part of this specification, in which—

Figure 1:
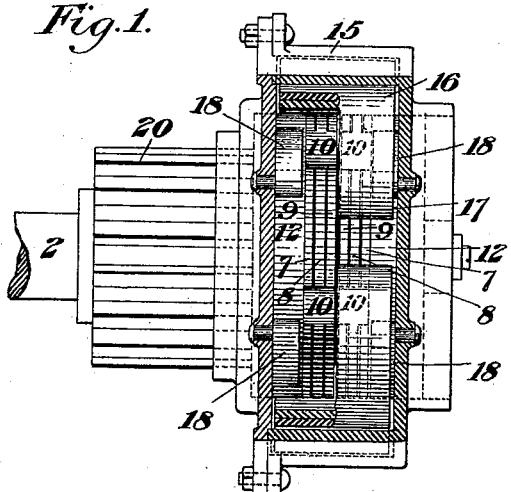
Figure 6:
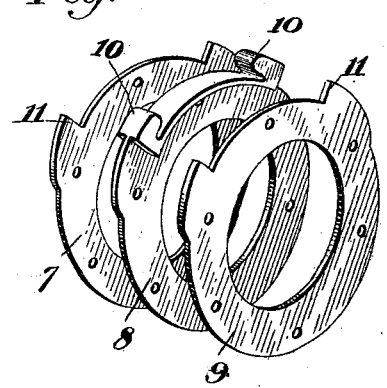
Figure 2:
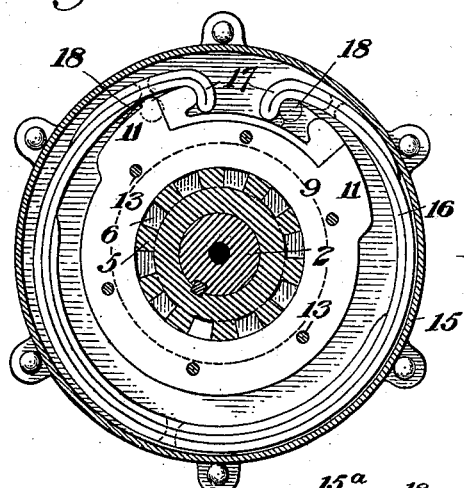
Figure 3:
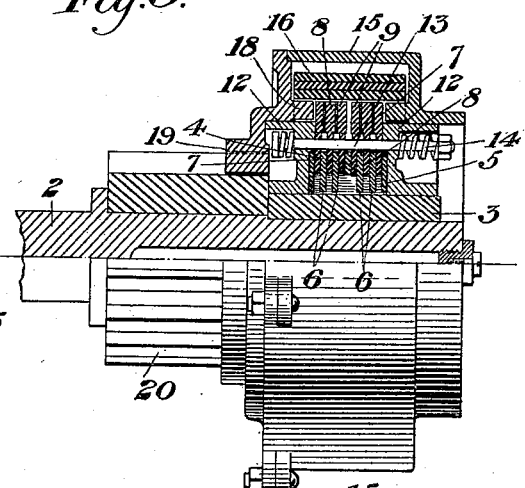
Figure 4:
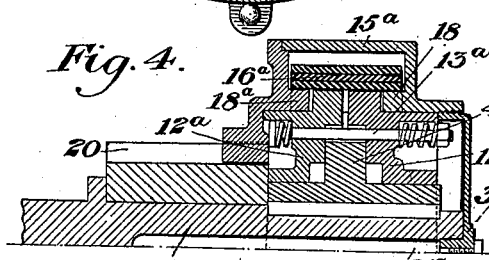
Figure 5:
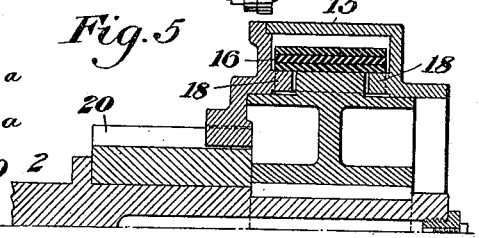
Figure 7:
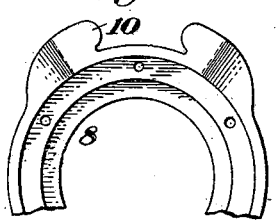
Figure 8:
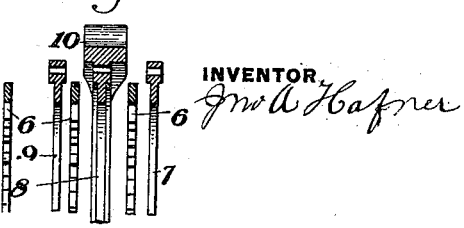
Figure 9:
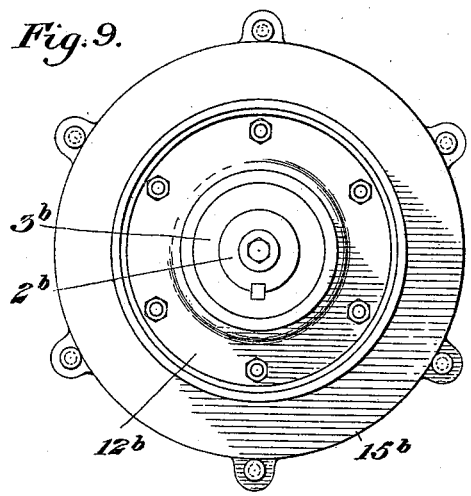
Figure 10:
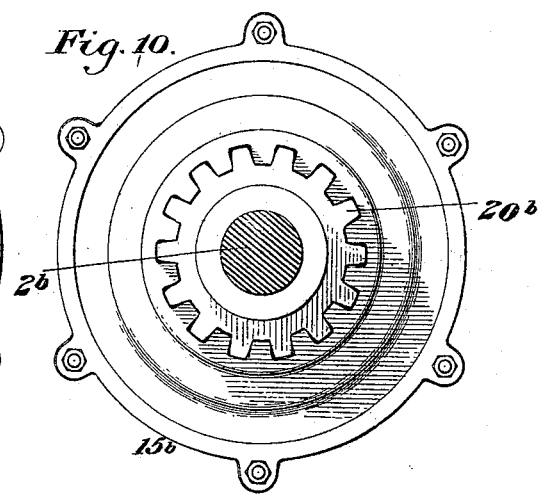
Figure 11:
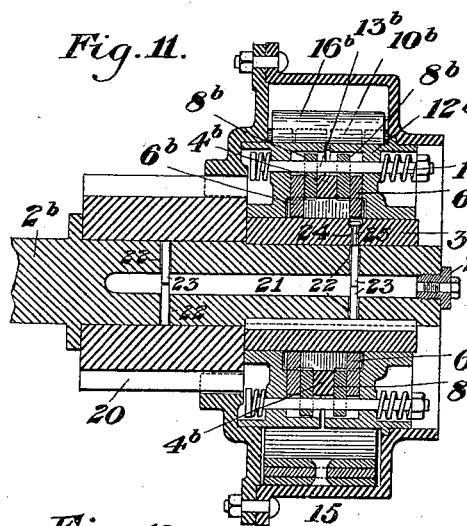
Figure 12:
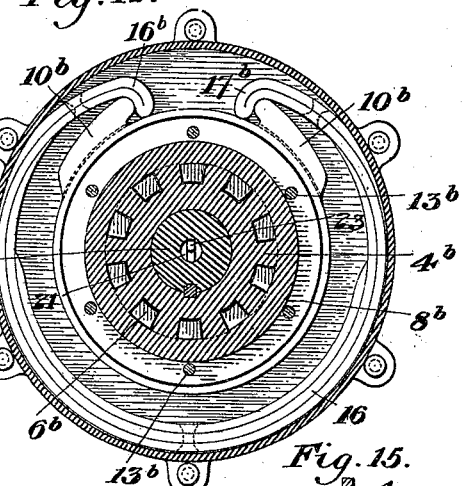
Figure 13:
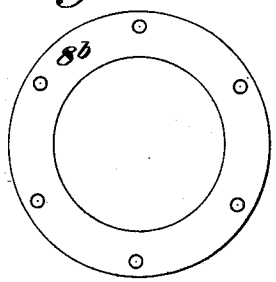
Figure 14:
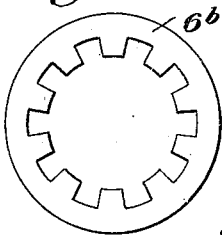
Figure 15:
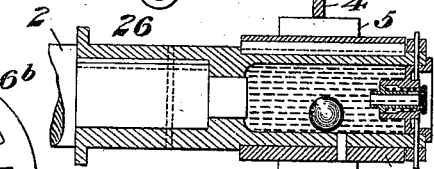
Figure 16:
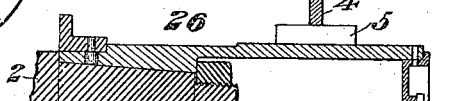
Figure 17:
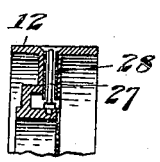
Figure 18:
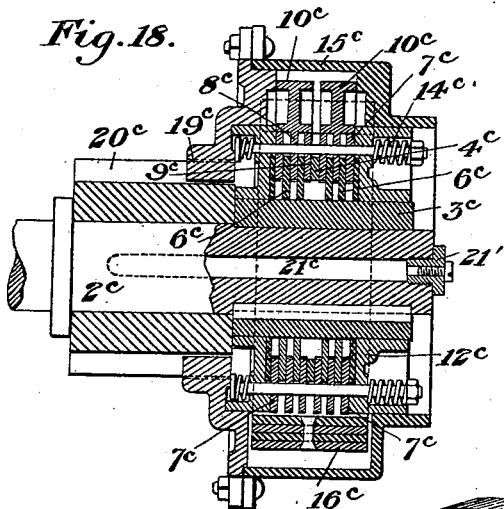
Figure 21:
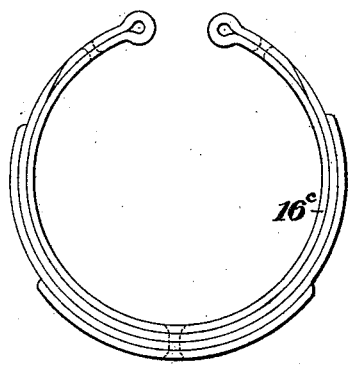
Figure 22:
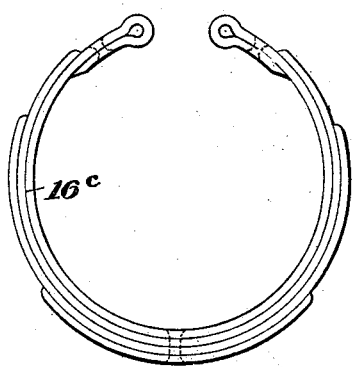
Figure 23:
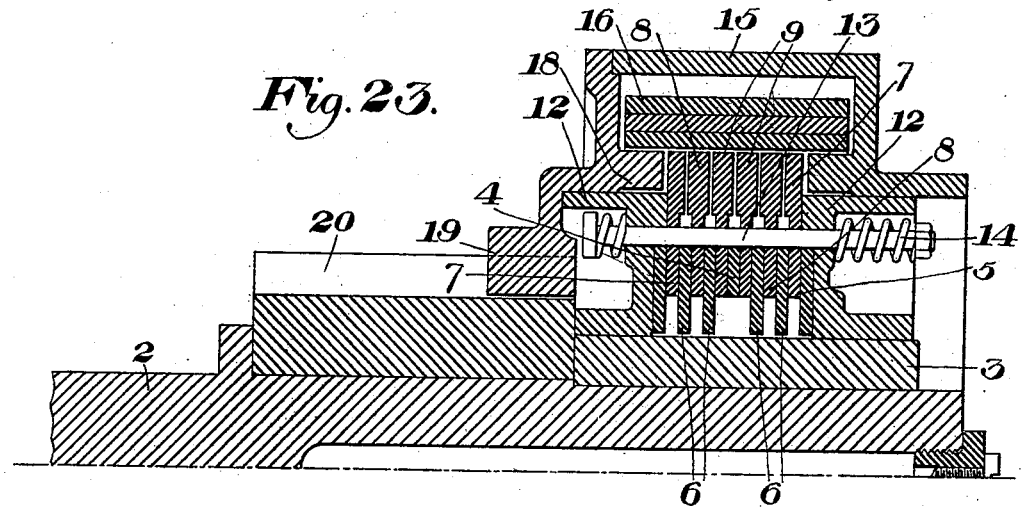
Figure 24:
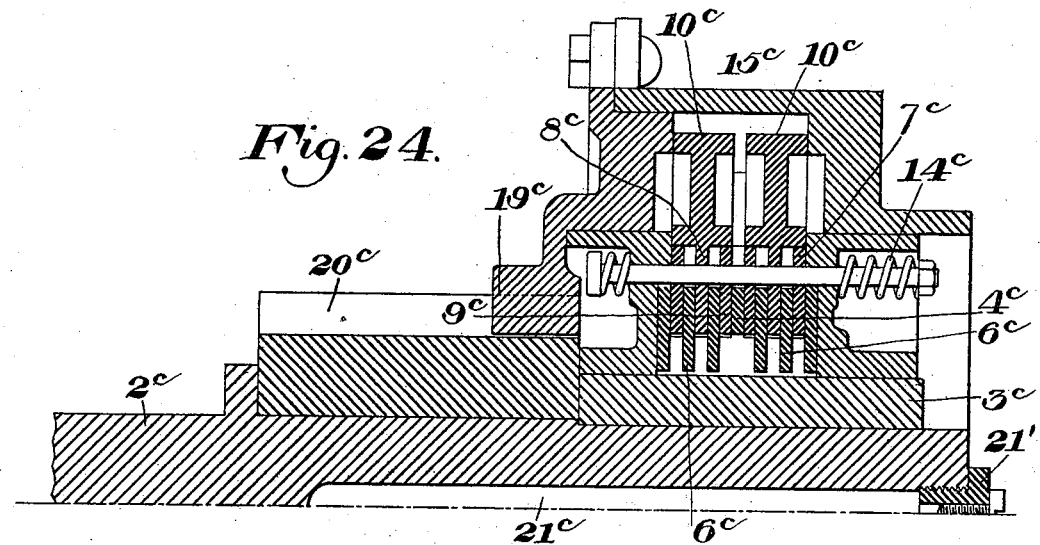

Figure 1 is a top plan view, partly broken away, of my improved motor mechanism. Fig. 2 is a vertical section of the same. Fig. 3 is a side elevation, the upper half being shown in vertical section. Figs. 4 and 5 are partial vertical sections showing modified forms. Fig. 6 is a perspective view of the ring and disks I employ. Fig. 7 is a partial side elevation of my preferred form of ring. Fig. 8 is a partial sectional view of the ring of Fig. 7 in connection with the disks. Figs. 9 and 10 are end elevations looking in opposite directions. Fig. 11 is a vertical sectional view of a modified form. Fig. 12 is a vertical section at right angles to that of Fig. 11. Figs. 13 and 14 are detail views of the disks. Figs. 15 and 16 are sectional views illustrating different forms of sleeves for applying the device to motors. Fig. 17 illustrates an oil-trap. Fig. 18 is a vertical sectional view of a third form of my invention, Fig. 19 being a view of the same form taken at right angles to that of Fig. 18. Fig. 20 is a perspective view of the ring and disks employed in this modification. Figs. 21 and 22 are detail views of springs employed therein; and Figs. 23 and 24 are partial enlarged sectional views similar to Figs. 3 and 18, respectively.

My invention relates to the connections between rotary shafts and mechanism which is operated thereby and is designed to afford a yielding power connection which shall prevent excessive strain and wear upon the starting of the shaft in motion and also to provide a spring connection between the shaft and mechanism driven thereby, which in either direction of rotation will operate to relieve strain upon the shaft and its driving-motor.

In the drawings, referring to the form shown in Figs. 1, 2, and 3, 2 represents a motor-shaft, such as the armature of an electric motor, and 3 is a hub keyed to this shaft. Secured to the hub is a central ring 4, having side flanges 5 5 and provided with a series of transverse slots extending therethrough, as shown in Fig. 2. Over each flange 5 are slipped three internally-toothed disks 6, the teeth of which enter the slots of the ring 4. Alternating with these disks upon each side and having their faces in frictional contact therewith and with the projecting portion of the ring 4 are disks 7, 8, and 9, each disk 8 having upon one side oppositely-located lugs 10 10. The leaves or disks 7 and 9 are provided with projecting lugs 11 11, which engage the shoulders at the rear of the lugs 10 10 and assist in holding the three disks in correct relation to each other. Inclosing the ring and disks is a clutch-casing 12, which surrounds and rotates upon the hub 3, and through the opposite sides of which extend bolts 13, which pass through holes in the two sets of disks 7, 8, and 9 and hold them in frictional contact with the ring 4 and toothed disks, the amount of friction being regulated by springs 14, surrounding the bolts. Surrounding and rotating upon the clutch-casing is a spring-casing 15, containing a spring 16 of circular shape, having hooked ends 17, which ends engage the lugs 10 upon the disks 8 and also lugs 18 projecting inwardly from the spring-casing. The lugs 10 and 18 register with each other crosswise when the parts are at rest. The inner separable cover portion of this spring-casing is provided with inner teeth 19, engaging the teeth of a pinion 20, which revolves loosely upon the armature-shaft and gears with the driving mechanism of the car. To protect the parts from dust, &c., I preferably employ the screw-cap 30, which engages the outer casing.

In operation, when the shaft 2 begins to rotate, thereby rotating the ring 4 and disks 6, one set of the lugs 10 upon the disks 8 will start to coil up the spring 16, the hooked end of the spring which is engaged by these lugs leaving the lugs upon the casing, the other end being held in place by the other casing-lugs opposite thereto. As the greatest resistance occurs at the time of starting the car this resistance will cause the alternate leaves of the clutch to slip past each other, thus giving a yielding connection, and as this resistance decreases the slipping of the clutch will cease and the motion will be communicated through the spring and its casing to the driving connections, the jar of starting the motor being thus taken up by the friction-clutch and the spring connection. It will be noticed that this spring operates equally well, no matter in which direction the armature-shaft is rotated.

In my preferred form of the connected ring and disks (shown in Figs. 7 and 8) it will be noticed that the lugs 11 are done away with, the ring 8 being provided with annular seats for the rings 7 and 9, the bolt connection being relied upon to hold these parts in proper position relative to each other.

In the form of Fig. 4 disks 6, 7, 8, and 9 are done away with, the two parts of the casing $12^a$ bearing frictionally upon the ring $4^a$ being held by the bolts $13^a$. In this case the lugs are placed upon the two parts of the clutch-casing instead of upon the disks 8, as before.

In the form of Fig. 5 the clutch is done away with entirely, the hub or ring secured to the shaft carrying the lugs which engage the spring thus giving the beneficial results of the spring connection to take up a jar in the starting of the car.

In the form of Figs. 11 and 12 I use only two of the toothed disks $6^b$ and two of the friction-disks $8^b$. The clutch-casing is extended inwardly, as shown, and the lugs $10^b$ are formed thereon instead of upon the disks $8^b$.

Figure 19:
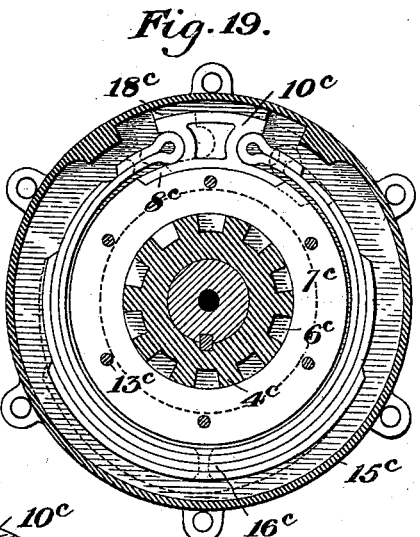
Figure 20:
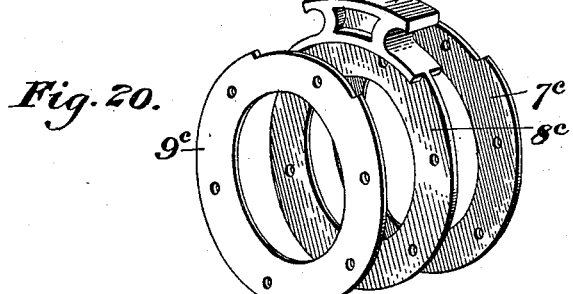

In the form of Figs. 18, 19, and 20 the construction is substantially the same as that of Figs. 1, 2, and 3, except that the spring and lugs are so arranged that the spring is forced outwardly instead of being wound up and drawn inwardly upon rotation of the armature-shaft, the parts being designated by the same numerals, differentiated by the exponent "c."

In Figs. 21 and 22 I show different forms of springs for use in the apparatus of Figs. 18, 19, and 20.

In using my mechanism I preferably employ some sort of oiling device. Thus in Fig. 11 I show the armature-shaft bored out so as to form an inner oil-reservoir 21, which is closed by a screw-plug 21'. In the shaft are provided transverse holes 22, in which lie loose pins 23, which are cut into two pieces, as shown. The hub $3^b$ is also provided with smaller holes 24, registering with the holes 22 and containing pins 25, having heads, as shown, which normally close these holes, but are moved out by centrifugal force when the parts are in motion, so as to allow oil to flow out into the clutch.

In Figs. 15 and 16 I show means for oiling when the device is attached to an old armature-shaft, a separate sleeve 26 being secured to the shaft and containing the oil-reservoir. When thick oil or grease is employed, I preferably use a loose ball 29, which will work about in the oil-cavity and induce a flow through the oiling-duct.

In Fig. 17 I show the clutch-casing as provided with a headed pin 27 in a hole 28, which will drop when the parts are at rest and allow the oil to flow back through the clutch.

The advantages of my invention will be apparent to those skilled in the art, since the necessity for the usual complicated electrical controller is done away with. My device renders the use of these complicated controllers and circuit and resistance arrangements therefor unnecessary, and a series multiple switch, for example, is all that will be needed, the only electrical device necessary being one arranged so that the operator may regulate the speed. Instead of using a fixed ring 4 upon the hub I may use a loose toothed disk, similar to the disks 6 at this point.

Variations in the form and arrangement of the parts may be made by the skilled mechanic without departing from my invention, since

What I claim is—

1. The combination with a casing, having an inner curved spring connected therewith, of a hub rotating in the casing and arranged to act upon said spring in either direction of rotation, substantially as described.

2. The combination with a casing having therein lugs and a curved spring whose ends are arranged to engage the lugs, of a hub within the casing also having projections arranged to engage the spring and thereby rotate the casing, substantially as described.

3. The combination with an outer casing and two spring-connected disks, having a spring connection therewith, of an intermediate positively-driven disk between the said disks, substantially as described.

4. The combination with a shaft having two or more disks connected to and driven thereby, of a disk or disks between them, a clutch-casing connected to the latter disks, bolts passing through the latter disk or disks, and the clutch-casing, and springs surrounding the bolts outside of the casing; substantially as described.

5. The combination with a rotatory hub having a ring secured thereto, of friction-disks secured to the ring, a second series of disks arranged intermediate thereof, an outer casing and spring connections between the said casing and the second series of disks substantially as described.

6. The combination with a rotating hub having a ring secured thereto, of friction-disks secured to the ring, and a second series of disks arranged intermediate thereof, said second series having a spring connection with each other, an outer casing and spring connections between the casing and the second series of disks, substantially as described.

7. The combination with a rotatory hub having a ring secured thereto, of friction-disks secured to the ring, a second series of disks arranged intermediate thereof and having lugs, and a casing containing a curved spring engaging the lugs substantially as described.

8. The combination with a rotatory hub having a ring secured thereto, of friction-disks secured to the ring, a second series of disks arranged intermediate thereof, an outer casing having spring connection with the second series of disks, bolts passing through the second series, and springs surrounding the bolts substantially as described.

9. The combination with a shaft having a clutch connection with an inner casing, of an outer casing, and a spring connection between the same and the inner casing, substantially as described.

10. The combination with a hub having a slotted ring provided with lateral flanges secured thereto, of toothed disks slipped over the flanges, the teeth engaging the slots of the ring, friction-disks between the toothed disks and the ring, an outer casing, and a connection between the friction-disks and said casing, substantially as described.

11. The combination with a hub, having a slotted ring provided with lateral flanges secured thereto, of toothed disks slipped over the flanges, the teeth engaging the slots of the ring, friction-disks between the toothed disks and the ring, and a casing having spring-pressed bolts passing through the friction-disks, substantially as described.

12. The combination with a hub, having a slotted ring provided with lateral flanges secured thereto, of toothed disks slipped over the flanges, the teeth engaging the slots of the ring, friction-disks between the toothed disks and the ring, a casing having bolts passing through the friction-disks, and an outer casing having a spring connection with the friction-disks, substantially as described.

13. The combination with a hub having a slotted ring provided with lateral flanges secured thereto, of toothed disks slipped over the flanges, the teeth engaging the slots of the ring, friction-disks between the toothed disks and the ring, a casing having spring-pressed bolts passing through the friction-disks, lugs upon the friction-disks, a surrounding spring having hooked ends arranged to engage the lugs, and a casing also having lugs engaging the ends of the spring, substantially as described.

14. The combination with a hub, of a casing surrounding the same and connected thereto, said casing having teeth, and a pinion having the same axis of rotation as the hub, the teeth of the pinion engaging the teeth of the casing and being longer than them, whereby the said pinion may act as a coupling between the casing and another element substantially as described.

In testimony whereof I have hereunto set my hand.

JOHN A. HAFNER.

Witnesses:
G. I. HOLDSHIP,
C. E. MACKOWN.